(12) United States Patent
Inoue et al.

(10) Patent No.: US 7,321,481 B2
(45) Date of Patent: Jan. 22, 2008

(54) OPTICAL RECORDING MEDIUM

(75) Inventors: Hiroyasu Inoue, Chuo-ku (JP); Koji Mishima, Chuo-ku (JP); Masaki Aoshima, Chuo-ku (JP); Hironori Kakiuchi, Chuo-ku (JP)

(73) Assignee: TDK Corporation, Chuo-Ku (JP)

( * ) Notice: Subject to any disclaimer, the term of this patent is extended or adjusted under 35 U.S.C. 154(b) by 240 days.

(21) Appl. No.: 10/612,615

(22) Filed: Jul. 1, 2003

(65) Prior Publication Data
US 2004/0004932 A1    Jan. 8, 2004

(30) Foreign Application Priority Data
Jul. 4, 2002    (JP) .............. 2002-196334

(51) Int. Cl.
*G11B 5/82* (2006.01)
(52) U.S. Cl. ..................................... 360/135
(58) Field of Classification Search ............... 369/283, 369/286, 288, 275.3, 111, 275.4, 280, 281; 428/64.1, 64.4; 360/135
See application file for complete search history.

(56) References Cited

U.S. PATENT DOCUMENTS

| | | | |
|---|---|---|---|
| 3,959,799 A | 5/1976 | Gambino et al. | 346/135 |
| 4,357,616 A | 11/1982 | Terao et al. | 346/135.1 |
| 4,477,819 A | 10/1984 | Lee et al. | 346/76 L |
| 4,587,533 A | 5/1986 | Nakane et al. | 346/135.1 |
| 4,647,947 A | 3/1987 | Takeoka | 346/135.1 |
| 4,670,345 A | 6/1987 | Morimoto | 428/411.1 |
| 4,682,321 A | 7/1987 | Takaoka et al. | |
| 4,771,413 A | 9/1988 | Nago | 369/109 |
| 4,772,897 A | 9/1988 | Ohkawa | 346/135.1 |
| 5,208,088 A | 5/1993 | Tominaga et al. | 428/64 |
| 5,297,132 A | 3/1994 | Takano et al. | 369/284 |
| 5,401,330 A | 3/1995 | Saito et al. | 136/259 |
| 5,458,941 A | 10/1995 | Hintz | 428/64.4 |
| 5,656,370 A | 8/1997 | Murakami et al. | 428/332 |

(Continued)

FOREIGN PATENT DOCUMENTS

CN    1330368 A    1/2002

(Continued)

OTHER PUBLICATIONS

Inoue, H., et al., "Inorganic Write-Once Disc for High Speed Recording," Jpn. J. Appl. Phys. vol. 42, part 1, No. 2B, pp. 1056-1061, Feb. 2003.

(Continued)

*Primary Examiner*—Tianjie Chen
(74) *Attorney, Agent, or Firm*—Seed IP Law Group PLLC

(57) ABSTRACT

An optical recording medium includes a substrate, a light transmission layer and a plurality of recording layers between the substrate and the light transmission layer and capable of recording data in the plurality of recording layers and reproducing data recorded in the plurality of recording layers by projecting a laser beam via the light transmission layer onto the plurality of recording layers, at least one recording layer other than a farthest recording layer from the light transmission layer including a reflective film containing Ag as a primary component and C as an additive. In the thus constituted optical recording medium, recording characteristics and reproducing characteristic of the respective recording layers can be improved.

10 Claims, 9 Drawing Sheets

U.S. PATENT DOCUMENTS

| | | | |
|---|---|---|---|
| 5,912,104 A | 6/1999 | Hirotsune et al. | 430/270.13 |
| 6,033,752 A | 3/2000 | Suzuki et al. | 428/64.1 |
| 6,096,399 A | 8/2000 | Yoshinari et al. | 428/64.1 |
| 6,111,851 A | 8/2000 | Ohki et al. | 369/286 |
| 6,143,469 A | 11/2000 | Ohta et al. | 430/270.13 |
| 6,210,860 B1 | 4/2001 | Fukano et al. | 430/270.12 |
| 6,254,966 B1 | 7/2001 | Kondo | 428/156 |
| 6,551,679 B1 | 4/2003 | Kuroda et al. | 428/64.1 |
| 6,608,799 B2 | 8/2003 | Hozumi | 369/13.26 |
| 6,636,477 B1* | 10/2003 | Miyamoto et al. | 369/286 |
| 6,660,451 B1 | 12/2003 | Sakaue et al. | |
| 6,670,014 B2 | 12/2003 | Nishihara et al. | |
| 6,788,635 B1* | 9/2004 | Aratani et al. | 369/100 |
| 7,018,694 B2 | 3/2006 | Hosoda et al. | |
| 2001/0012257 A1 | 8/2001 | Suzuki et al. | 369/94 |
| 2001/0021160 A1 | 9/2001 | Shuy et al. | 369/100 |
| 2001/0044002 A1 | 11/2001 | Shingai et al. | 428/64.4 |
| 2002/0060979 A1* | 5/2002 | Tsukuda et al. | 369/275.4 |
| 2002/0076646 A1 | 6/2002 | Zhou et al. | 430/270.13 |
| 2003/0086359 A1* | 5/2003 | Lee et al. | 369/275.3 |
| 2003/0165111 A1* | 9/2003 | Flynn | 369/288 |
| 2003/0190551 A1 | 10/2003 | Aoshima et al. | 430/270.12 |
| 2003/0202452 A1 | 10/2003 | Mishima et al. | 369/112.23 |
| 2003/0228539 A1 | 12/2003 | Hosoda et al. | |
| 2004/0001418 A1* | 1/2004 | Shinotsuka et al. | 369/111 |
| 2004/0018334 A1* | 1/2004 | Nee | 428/64.1 |
| 2004/0052194 A1 | 3/2004 | Inoue et al. | 369/112.23 |
| 2004/0157158 A1 | 8/2004 | Kakiuchi et al. | 430/270.12 |

FOREIGN PATENT DOCUMENTS

| | | |
|---|---|---|
| EP | 0 068 801 B1 | 9/1986 |
| EP | 0 474 311 A1 | 3/1992 |
| EP | 0 350 078 B1 | 3/1994 |
| EP | 0 822 543 A1 | 2/1998 |
| EP | 0 978 831 A2 | 2/2000 |
| EP | 1 028 421 A2 | 8/2000 |
| EP | 1122723 | 8/2001 |
| EP | 1 139 340 A2 | 10/2001 |
| EP | 1 154 413 A2 | 11/2001 |
| EP | 1 172 811 A2 | 1/2002 |
| EP | 1 178 472 A2 | 2/2002 |
| EP | 0 947 351 B1 | 9/2002 |
| EP | 1 351 230 A2 | 10/2003 |
| GB | 2336463 A | 10/1999 |
| JP | 57-022095 | 2/1982 |
| JP | 57-027788 | 2/1982 |
| JP | 58-220794 | 12/1983 |
| JP | 59-225992 | 12/1984 |
| JP | 60-160036 | 8/1985 |
| JP | 62-204442 | 9/1987 |
| JP | 62-245545 | 10/1987 |
| JP | 01-158633 | 6/1989 |
| JP | 2-152029 | 6/1990 |
| JP | 4-86283 | 3/1992 |
| JP | 4-226785 | 8/1992 |
| JP | 6-171236 | 6/1994 |
| JP | 6262854 | 9/1994 |
| JP | 10-76755 | 3/1998 |
| JP | 410143919 A | 5/1998 |
| JP | 2000-187884 | 7/2000 |
| JP | 2000-285509 | 10/2000 |
| JP | 2000285509 A * | 10/2000 |
| JP | 2001-243655 | 9/2001 |
| JP | 2001322357 | 11/2001 |
| JP | 2002-104317 | 4/2002 |
| JP | 2002-120458 | 4/2002 |
| JP | 2002-269808 | 9/2002 |
| JP | 2003-54135 | 2/2003 |
| JP | 2003-85778 | 3/2003 |
| JP | 2003260874 | 9/2003 |
| WO | WO 01/93256 A1 | 12/2001 |

OTHER PUBLICATIONS

Yoshii, K., et al., "Investigation of Hole Formation on Cr/Al, Si/Al, and C/Al Bilayer Films by Laser Bean Irradiation," *Journal of Applied Physics* 55(1):223-229, Jan. 1, 1984.

Partial English Translation of Takaoka et al. (JP 60-160036A), pp. 243, 244, 246.

Partial English Translation of Takaoka et al. (JP 60-160036A), pp. 243, 244, 246, no date.

* cited by examiner

OPTICAL RECORDING MEDIUM

BACKGROUND OF THE INVENTION

The present invention relates to an optical recording medium and, particularly, to an optical recording medium having a plurality of recording layers and in which recording characteristics and reproducing characteristic of the respective recording layers can be improved.

DESCRIPTION OF THE PRIOR ART

Optical recording media such as the CD, DVD and the like have been widely used as recording media for recording digital data. Such optical recording media require improvement in ability to record large amounts of data and various proposals have been made in order to increase the data recording capacity thereof One of these is an optical recording medium having two recording layers and such an optical recording medium has been already put to the practical use as an optical recording medium adapted to enable only data reading, such as the DVD-Video and the DVD-ROM.

An optical recording medium adapted only for reading data and provided with two recording layers is formed by laminating two substrates each having prepits constituting a recording layer on the surface thereof via an intermediate layer.

Further, an optical recording medium having two recording layers has been recently proposed in connection with optical recording media in which data can be rewritten by the user (See Japanese Patent Application Laid Open No. 2001-243655 etc.).

A rewritable type optical recording medium having two recording layers is constituted by laminating recording layers each including a recording film sandwiched between dielectric layers (protective layers) via an intermediate layer.

In the case where data are to be recorded in a rewritable type optical recording medium having two recording layers, the phase state of one of the recording layers is changed by adjusting the focus of a laser beam onto the one of the recording layers, setting the power of the laser beam to a recording power Pw whose level is sufficiently higher than a reproducing power Pr and, projecting the laser beam onto the recording layer to form a record mark at a predetermined region of the recording layer.

Since the reflection coefficient of the thus formed record mark is different from those of blank regions in which no record mark is formed, it is possible to reproduce data recorded in one of the recording layers by adjusting the focus of the laser beam onto the recording layer, projecting the laser beam whose power is set to the reproducing power Pr and detecting the amount of light reflected by the recording layer.

In this manner, in the rewritable type optical recording medium having two recording layers, since data are recorded in one of the recording layers and data recorded in the recording layer are reproduced by adjusting the focus of the laser beam onto the recording layer and projecting the laser beam onto the recording layer, when data are to be recorded in the farther recording layer (hereinafter referred to as the "L1 layer") from the light incident plane and data are produced therefrom, the laser beam is projected via the closer recording layer (hereinafter referred to as the "L0 layer") to the light incident plane onto the L1 layer.

Therefore, in order to record data in the L1 layer and reproduce data from the L1 layer in a desired manner, it is necessary for the L0 layer to have a sufficiently high light transmittance for the laser beam and the L0 layer is required to have a thin reflective film.

However, as the reflective film included in the L0 layer is made thinner, heat generated in the recording film included in the L0 layer by the laser beam is not readily radiated. On the other hand, as the reflective film included in the L0 layer is made thicker, the light transmittance of the L0 layer is inevitably lowered.

In the case where the L0 layer does not have a sufficiently heat radiation characteristic, since heat generated by the irradiation with the laser beam is stored excessively in the recording film included in the L0 layer, the width of a record mark recorded in the recording film becomes larger and, therefore, data cannot be recorded therein in a desired manner. In the case where the heat radiation characteristic of the L0 layer is particularly low, the recording film once changed to an amorphous state is again crystallized in a recording film containing a phase change material and it is impossible to form a record mark having a desired shape.

In view of the above, it has been difficult to simultaneously improve the recording characteristic and the reproducing characteristic of the L0 layer and those of the L1 layer.

The same problems also occur in a write-once type optical recording medium having two or more recording layers and an optical recording medium having an L1 layer for reading data only and it has been desired to solve there problems.

SUMMARY OF THE INVENTION

It is therefore an object of the present invention to provide an optical recording medium having a plurality of recording layers and in which recording characteristics and reproducing characteristic of the respective recording layers can be improved.

The above and other objects of the present invention can be accomplished by an optical recording medium comprising a substrate, a light transmission layer and a plurality of recording layers between the substrate and the light transmission layer and capable of recording data in the plurality of recording layers and reproducing data recorded in the plurality of recording layers by projecting a laser beam via the light transmission layer onto the plurality of recording layers, at least one recording layer other than a farthest recording layer from the light transmission layer including a reflective film containing Ag as a primary component and C as an additive.

It is necessary to form a reflective film of a material having a high light transmittance and a high thermal conductivity in order to simultaneously improve the recording characteristic and the reproducing characteristic of the L0 layer and those of the L1 layer and Ag is a typical material having such characteristics. However, Ag corrodes easily. Therefore, when the reflective film included in the L0 layer is formed of Ag, the storage reliability of the optical recording medium is low. However, according to the present invention, since at least one recording layer other than a farthest recording layer from the light transmission layer includes a reflective film containing Ag as a primary component and C as an additive, it is possible to improve the light transmittance and the thermal conductivity of the reflective film included in the L0 layer while preventing the reflective film from being corroded and it is therefore possible to improve recording characteristics and reproducing characteristic of the respective recording layers and improve the storage reliability of the optical recording medium.

In particular, since energy per unit area of the spot of a laser beam is high in a next-generation type optical recording medium in which the thickness of the light transmission layer is set at 30 μm to 200 μm and data are recorded therein and reproduced therefrom by condensing a laser beam having a wavelength equal to or shorter than 450 nm using an objective lens having a numerical aperture equal to or larger than 0.7, it is required for the next-generation type optical recording medium to have a high heat radiation characteristic and, therefore, the present invention can be particularly effectively applied to the next-generation type optical recording medium.

Further, according to the present invention, since the reflective film contains Ag as a primary component and inexpensive C as an additive, it is possible to prevent material cost of the optical recording medium from increasing.

In the present invention, it is preferable that the reflective film included in the at least one recording layer other than the farthest recording layer from the light transmission layer contains 0.5 atomic % to 5.0 atomic % of C. When the amount of C added to the reflective film exceeds 5.0 atomic %, it is difficult to form a reflective film having sufficiently high light transmittance and thermal conductivity and, on the other hand, when the amount of C added to the reflective film is less than 0.5 atomic %, the storage reliability of the optical recording medium becomes low.

In the present invention, it is more preferable that the reflective film contains 1.0 atomic % to 4.0 atomic % of C and it is particularly preferable that the reflective film contains about 2.5 atomic % of C. When the amount of C added to the reflective film is equal to or less than 4.0 atomic %, it is possible to form a reflective film having light transmittance close to that of a reflective film formed of pure Ag and on the other hand, when the amount of C added to the reflective film exceeds 2.0 atomic %, improvement in the storage reliability of the optical recording medium is small even if the amount of C is increased. When the reflective film contains about 2.5 atomic % of C, it is possible to form a reflective film having substantially the same light transmittance as that of a reflective film formed of pure Ag and obtain the optical recording medium having high storage reliability.

In a preferred aspect of the present invention, each of the plurality of recording layers contains a phase change material.

In a further preferred aspect of the present invention, each of the plurality of recording layers contains a SbTe system material.

In a further preferred aspect of the present invention, each of the plurality of recording layers contains a SbTe system material represented by a compositional formula: $(Sb_xTe_{1-x})_{1-y}M_y$ wherein M is an element other than Sb and Te, x is equal to or larger than 0.55 and equal to or smaller than 0.9 and y is equal to or larger than 0 and equal to or smaller than 0.25.

In a further preferred aspect of the present invention, M is constituted as one or more elements selected from the group consisting of In, Ag, Au, Bi, Se, Al, P, Ge, H, Si, C, V, W, Ta, Zn, Mn, Ti, Sn, Pd, N, O and rare earth elements.

In another preferred aspect of the present invention, each of the plurality of recording layers includes a first recording film containing one kind of element selected from the group consisting of Si, Ge, Sn, Mg, C, Al, Zn, In, Cu and Bi as a primary component and a second recording film disposed in the vicinity of the first recording film and containing one kind of element from the group consisting of Cu, Al, Zn, Si and Ag and different from the element contained in the first recording film as a primary component and the element contained in the first recording film as a primary component and the element contained in the second recording film as a primary component are mixed when the first recording film and the second recording film is irradiated with a laser beam, thereby forming a record mark.

In a further preferred aspect of the present invention, the first recording film contains an element selected from the group consisting of Si, Ge, Sn, Mg, In, Zn, Bi and Al as a primary component and the second recording film contains Cu as a primary component.

In a further preferred aspect of the present invention, the first recording film contains an element selected from the group consisting of Si, Ge, Sn, Mg and Al as a primary component.

In a further preferred aspect of the present invention, an element selected from the group consisting of Al, Si, Zn, Mg, Au, Sn, Ge, Ag, P, Cr, Fe and Ti is added to the second recording film containing Cu as a primary component.

In a further preferred aspect of the present invention, an element selected from the group consisting of Al, Zn, Sn and Au is added to the second recording film containing Cu as a primary component.

In another preferred aspect of the present invention, the first recording film contains an element selected from the group consisting of Si, Ge, C, Sn, Zn and Cu as a primary component and the second recording film contains Al as a primary component.

In a further preferred aspect of the present invention, an element selected from the group consisting of Mg, Au, Ti and Cu is added to the second recording film containing Al as a primary component.

In another preferred aspect of the present invention, the first recording film contains an element selected from the group consisting of Si, Ge, C and Al as a primary component and the second recording film contains Zn as a primary component.

In a further preferred aspect of the present invention, an element selected from the group consisting of Mg, Cu and Al is added to the second recording film containing Zn as a primary component.

In a further preferred aspect of the present invention, the first recording film and the second recording film are formed so that a total thickness thereof is 2 nm to 40 nm.

In the present invention, it is preferable that the light transmission layer has a thickness of 30 μm to 200 μm.

The above and other objects and features of the present invention will become apparent from the following description made with reference to the accompanying drawings.

DESCRIPTION OF THE PREFERRED EMBODIMENTS

Figure 1:
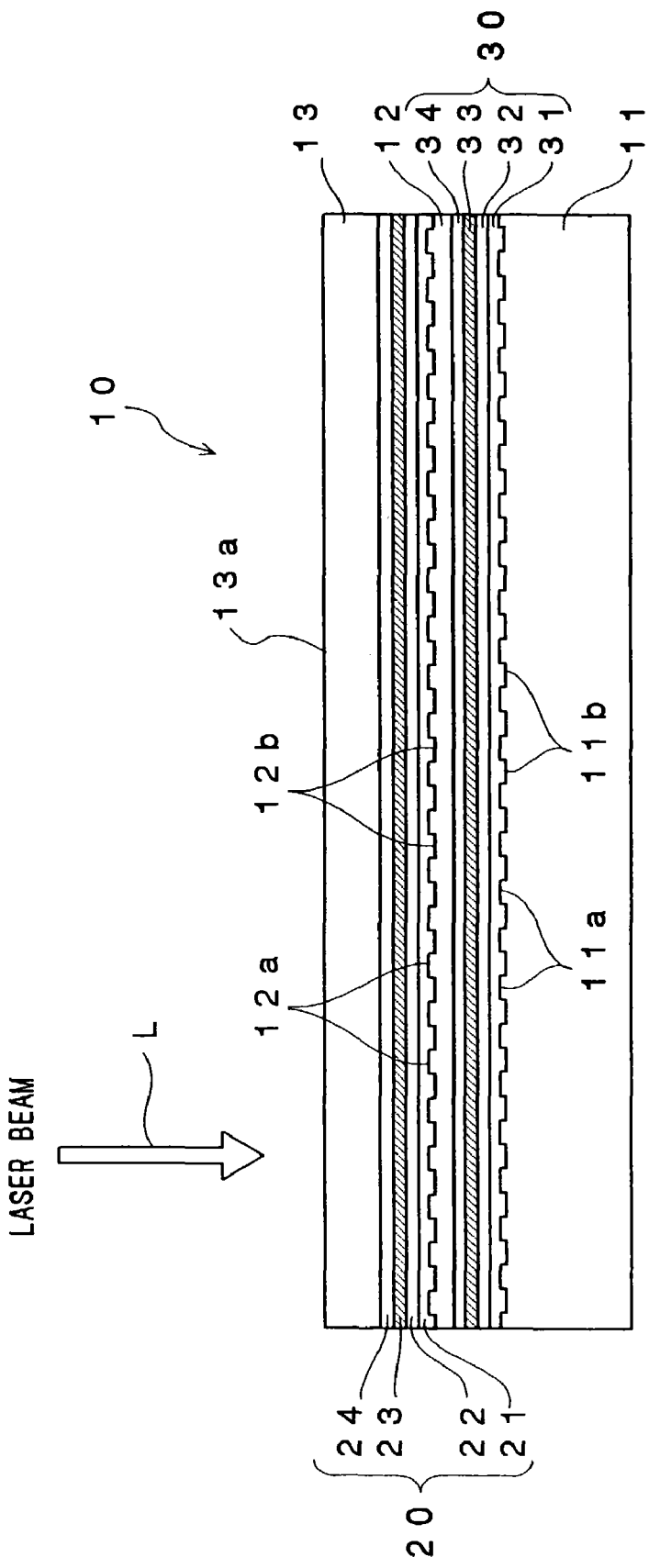
FIG. 1 is a schematic cross-sectional view showing the structure of an optical recording medium that is a preferred embodiment of the present invention.
Figure 2:
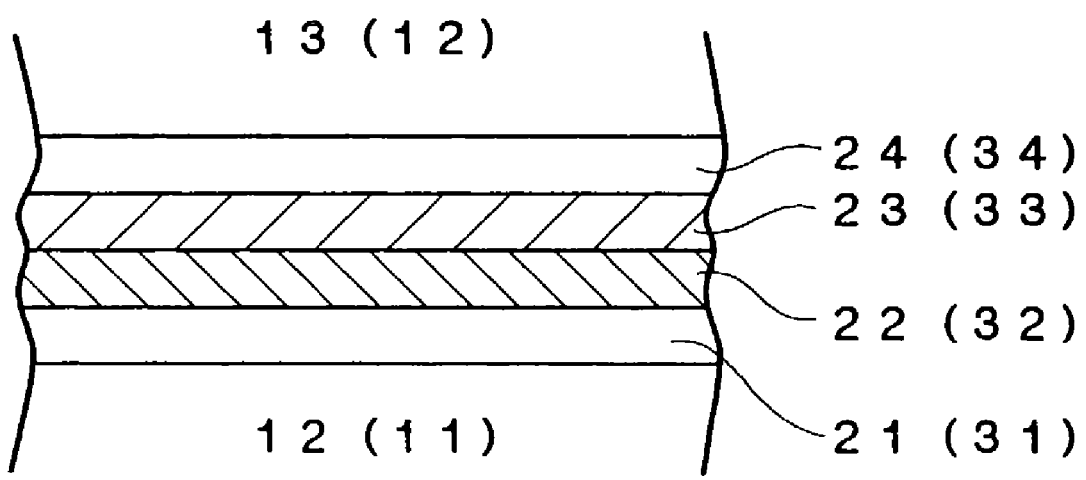
FIG. 2 is a schematic enlarged cross-sectional view of the optical recording medium shown in FIG. 1.

FIG. 1 is a schematic cross-sectional view showing the structure of an optical recording medium that is a preferred embodiment of the present invention and FIG. 2 is a schematic enlarged cross-sectional view of the optical recording medium shown in FIG. 1.

As shown in FIGS. 1 and 2, an optical recording medium 10 according to this embodiment is constituted as a rewritable type optical recording medium and includes a disk-like support substrate 11, a transparent intermediate layer 12, a light transmission layer 13, an L0 layer 20 formed between the transparent layer 12 and the light transmission layer 13, and an L1 layer 30 formed between the support substrate 11 and the transparent intermediate layer 12.

The L0 layer 20 and the L1 layer 30 are recording layers in which data are recorded, i.e., the optical recording medium 10 according to this embodiment includes two recording layers.

The L0 layer 20 constitutes a recording layer close to a light incident plane 13a and as shown in FIGS. 1 and 2, the L0 layer 20 is constituted by laminating a reflective film 21, a second dielectric film 22, an L0 recording film 23 and a first dielectric film 24 from the side of the support substrate 11.

On the other hand, the L1 layer 30 constitutes a recording layer far from the light incident plane 13a and as shown in FIGS. 1 and 2, the L1 layer 30 is constituted by laminating a reflective film 31, a fourth dielectric film 32, an L1 recording film 33 and a third dielectric film 34.

In the case where data are to be recorded in the L1 layer 30 and data recorded in the L1 layer 30 are to be reproduced, a laser beam L is projected thereon through the L0 layer 20 located closer to the light transmission layer 13.

Therefore, it is necessary for the L0 layer 20 to have a high light transmittance. Concretely, the L0 layer 20 has a light transmittance equal to or higher than 30% with respect to the laser beam L used for recording data and reproducing data and preferably has a light transmittance equal to or higher than 40%.

In order to record data with high density, it is necessary to reduce the diameter of the laser beam L and, therefore, the laser beam L used for recording data and reproducing data has a wavelength equal to or shorter than 500 nm and preferably a wavelength of 200 to 450 nm.

The support substrate 11 serves as a support for ensuring mechanical strength required for the optical recording medium 10.

The material used to form the support substrate 11 is not particularly limited insofar as the support substrate 11 can serve as the support of the optical recording medium 10. The support substrate 11 can be formed of glass, ceramic, resin or the like. Among these, resin is preferably used for forming the support substrate 11 since resin can be easily shaped. Illustrative examples of resins suitable for forming the support substrate 11 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin is most preferably used for forming the support substrate 11 from the viewpoint of easy processing, optical characteristics and the like and in this embodiment, the support substrate 11 is formed of polycarbonate resin. In this embodiment, since the laser beam L is projected via the light incident plane 13a located opposite to the support substrate 11, it is unnecessary for the support substrate 11 to have a light transmittance property.

In this embodiment, the support substrate 11 has a thickness of about 1.1 mm.

As shown in FIG. 1, grooves 11a and lands 11b are alternately formed on the surface of the support substrate 11. The grooves 11a and/or lands 11b serve as a guide track for the laser beam L when data are to be recorded or when data are to be reproduced.

The depth of the groove 11a is not particularly limited and is preferably set to 10 nm to 40 nm. The pitch of the grooves 11a is not particularly limited and is preferably set to 0.2 μm to 0.4 μm.

The transparent intermediate layer 12 serves to space the L0 layer 20 and the L1 layer 30 apart by a physically and optically sufficient distance.

As shown in FIG. 1, grooves 12a and lands 12b are alternately formed on the surface of the transparent intermediate layer 12. The grooves 12a and/or lands 12b formed on the surface of the transparent intermediate layer 12 serve as a guide track for the laser beam L when data are to be recorded or when data are to be reproduced.

The depth of the groove 12a and the pitch of the grooves 12a can be set to be substantially the same as those of the grooves 11a formed on the surface of the support substrate 11.

It is preferable to form the transparent intermediate layer 12 so as to have a thickness of 10 μm to 50 μm and it is more preferable to form it so as to have a thickness of 15 μm to 40 μm.

The material for forming the transparent intermediate layer 12 is not particularly limited and an ultraviolet ray curable acrylic resin is preferably used for forming the transparent intermediate layer 12.

It is necessary for the transparent intermediate layer 12 to have sufficiently high light transmittance since the laser beam L passes through the transparent intermediate layer 12 when data are to be recorded in the L1 layer 30 and data recorded in the L1 layer 30 are to be reproduced.

The light transmission layer 13 serves to transmit the laser beam L and the light incident plane 13a is constituted by one of the surfaces thereof.

It is preferable to form the light transmission layer 13 so as to have a thickness of 30 μm to 200 μm.

The material for forming the light transmission layer 13 is not particularly limited and, similarly to the transparent intermediate layer 12, an ultraviolet ray curable acrylic resin is preferably used for forming the light transmission layer 13.

It is necessary for the light transmission layer 13 to have sufficiently high light transmittance since the laser beam L passes through the transparent intermediate layer 13 when data are to be recorded in the L1 layer 30 and data recorded in the L1 layer 30 are to be reproduced.

Each of the L0 recording film 23 of the L0 layer 20 and the L1 recording film 33 of the L1 layer 30 is formed of a phase change material. Utilizing the difference in the reflection coefficients between the case where the L0 recording film 23 and the L1 recording film 33 are in a crystal phase and the case where they are in an amorphous phase, data are recorded in the L0 recording film 23 and the L1 recording film 33 and data are reproduced from the L0 recording film 23 and the L1 recording film 33.

The material for forming the L0 recording film 23 and the L1 recording film 33 is not particularly limited but a material capable of changing from an amorphous phase to a crystal phase in a short time is preferable in order to enable direct overwriting of data at a high velocity. Illustrative examples of materials having such a characteristic include a SbTe system material.

As the SbTe system material, SbTe may be used alone or a SbTe system material to which additives are added in order to shorten time required for crystallization and improve the long-term storage reliability of the optical recording medium 10 may be used.

Concretely, it is preferable to form the L0 recording film 23 and the L1 recording film 33 of a SbTe system material represented by the compositional formula: $(Sb_xTe_{1-x})_{1-y}M_y$, where M is an element other than Sb and Te, x is equal to or larger than 0.55 and equal to or smaller than 0.9 and y is equal to or larger than 0 and equal to or smaller than 0.25, and it is more preferable to form the L0 recording film 23 and the L1 recording film 33 of a SbTe system material represented by the above mentioned compositional formula wherein x is equal to or larger than 0.65 and equal to or smaller than 0.85 and y is equal to or larger than 0 and equal to or smaller than 0.25.

While M is not particularly limited, it is preferable for the element M to be one or more elements selected from the group consisting of In, Ag, Au, Bi, Se, Al, P, Ge, H, Si, C, V, W, Ta, Zn, Mn, Ti, Sn, Pd, N, O and rare earth elements in order to shorten time required for crystallization and improve the storage reliability of the optical recording medium 10. It is particularly preferable for the element M to be one or more elements selected from the group consisting of Ag, In, Ge and rare earth elements for improving the storage reliability of the optical recording medium 10.

Since the laser beam L passes through the L0 recording film 23 when data are to be recorded in the L1 layer 30 and data recorded in the L1 layer 30 are to be reproduced, it is necessary for the L0 recording film 23 to have a high light transmittance and it is therefore preferable to form the L0 recording film 23 so as to be thinner than the L1 recording film 33.

Concretely, it is preferable to form the L1 recording film 33 so as to have a thickness of 3 to 20 nm and form the L0 recording film 23 so as to have a thickness of 3 nm to 10 nm.

In the case where the thickness of the L0 recording film 23 and the L1 recording film 33 is thinner than 3 nm, the L0 recording film 23 and the L1 recording film 33 do not readily crystallize because a phase change material does not crystallize easily if it is formed extremely thin. On the other hand, in the case where the thickness of the L0 recording film 23 exceeds 10 nm, the light transmittance of the L0 recording film 23 is lowered and the characteristic of recording data in the L1 layer 30 and the characteristic of reproducing data from the L1 layer 30 are degraded.

The first dielectric film 24 and the second dielectric film 22 serve as protective layers for protecting the L0 recording film 23 and the third dielectric film 34 and the fourth dielectric film 32 serve as protective layers for protecting the L1 recording film 33.

The thickness of each of the first dielectric film 24, the second dielectric film 22, the third dielectric film 34 and the fourth dielectric film 32 is not particularly limited and it preferably has a thickness of 1 nm to 50 nm. In the case where the thickness of each of the first dielectric film 24, the second dielectric film 22, the third dielectric film 34 and the fourth dielectric film 32 is thinner than 1 nm, each of the first dielectric film 24, the second dielectric film 22, the third dielectric film 34 and the fourth dielectric film 32 does not sufficiently serve as a protective layer and is cracked during an initialization process described later and the characteristic (repeated overwriting characteristic) of the optical recording medium 10 when direct overwriting is repeated is degraded. On the other hand, in the case where the thickness of each of the first dielectric film 24, the second dielectric film 22, the third dielectric film 34 and the fourth dielectric film 32 exceeds 50 nm, a long time is required for forming it, thereby lowering the productivity of the optical recording medium 10 and there is some risk of cracking the L0 recording film 23 and the L1 recording film 33 due to internal stress.

The first dielectric film 24, the second dielectric film 22, the third dielectric film 34 and the fourth dielectric film 32 may have a single-layered structure or may have a multi-layered structure including a plurality of dielectric films. For example, if the first dielectric film 24 is constituted by two dielectric films formed of materials having different refractive indexes, light interference effect can be increased.

The material for forming the first dielectric film 24, the second dielectric film 22, the third dielectric film 34 and the fourth dielectric film 32 is not particularly limited but it is preferable to form the first dielectric film 24, the second dielectric film 22, the third dielectric film 34 and the fourth dielectric film 32 of oxide, sulfide, nitride of Al, Si, Ce, Zn, Ta, Ti and the like such as $Al_2O_3$, AlN, $SiO_2$, $Si_3N_4$, $CeO_2$, ZnS, TaO and the like or a combination thereof and it is more preferable for them to contain $ZnS.SiO_2$ as a primary component. $ZnS.SiO_2$ means a mixture of ZnS and $SiO_2$.

The reflective film 21 included in the L0 layer 20 serves to reflect the laser beam L entering the light incident plane 13a so as to emit it from the light incident plane 13a and effectively radiate heat generated in the L0 recording film 23 by the irradiation with the laser beam L.

When data are to be recorded in the L1 layer 30 and data recorded in the L1 layer 30 are to be reproduced, the laser beam L entering the light incident plane 13a impinges onto the L1 layer 30 via the reflective film 21. It is therefore necessary to form the reflective film 21 of a material having a high light transmittance and a high thermal conductivity. Further, it is necessary to form the reflective film 21 of a material having long-term storage reliability.

Therefore, in this embodiment, the reflective film 21 is formed of a material containing Ag as a primary component and C as an additive.

In the case where the reflective film 21 is formed of a material containing Ag as a primary component and C as an additive, it is possible to markedly improve the long-term storage reliability of the reflective film 21 without degrading the inherent high light transmittance and high thermal conductivity of the Ag. Further, material cost is not increased by adding C to the reflective film 21.

Therefore, if the reflective film 21 is formed of a material containing Ag as a primary component and C as an additive, a reflective film having a high light transmittance and a high thermal conductivity can be formed and the storage reliability of the optical recording medium 10 can be improved.

In a study carried out by the inventors of the present invention, it was found that the light transmittance and the thermal conductivity of the reflective film 21 tended to decrease as the amount of C added to the reflective film 21 increased and it was further found that when the amount of C added to the reflective film 21 was equal to or less than a predetermined value, the storage reliability of the optical recording medium 10 was improved as the amount of C added to the reflective film 21 increased and when the amount of C added to the reflective film 21 exceeded the predetermined value, improvement in the storage reliability of the optical recording medium 10 was not remarkable even if the amount of C added to the reflective film 21 was increased.

More specifically, when the amount of C added to the reflective film 21 exceeds 5.0 atomic %, it is difficult to form the reflective film 21 to have sufficiently high light transmittance and thermal conductivity and, on the other hand, when the amount of C added to the reflective film 21 is less than 0.2 atomic %, the storage reliability of the optical recording medium 10 becomes low. Therefore, it is preferable that the reflective film 21 contains 0.5 atomic % to 5.0 atomic % of C.

Further, when the amount of C added to the reflective film 21 is equal to or less than 4.0 atomic %, it is possible to form the reflective film 21 to have a light transmittance close to that of a reflective film 21 formed of pure Ag and, on the other hand, when the amount of C added to the reflective film 21 exceeds 2.0 atomic %, improvement in the storage reliability of the optical recording medium 10 is small even if the amount of C is increased. Furthermore, when the reflective film 21 contains about 2.5 atomic % of C, it is possible to form the reflective film 21 having substantially the same light transmittance as that of a reflective film 21 formed of pure Ag and obtain an optical recording medium 10 having high storage reliability. Therefore, it is more preferable that the reflective film 21 contains 1.0 atomic % to 4.0 atomic % of C and it is particularly preferable that the reflective film 21 contains about 2.5 atomic % of C.

Since the light transmittance and thermal conductivity of the reflective film 21 varies depending upon the amount of C added to the reflective film 21, the thickness of the reflective film 21 is determined based on the amount of C added to the reflective film 21 but, normally, the thickness of the reflective film 21 is preferably thinner than 20 nm and more preferably 5 nm to 15 nm.

The reflective film 31 included in the L1 layer 30 serves to reflect the laser beam L entering through the light incident plane 13a so as to emit it from the light incident plane 13a and effectively radiate heat generated in the L1 recording film 33 by the irradiation with the laser beam L.

The reflective film 31 is preferably formed so as to have a thickness of 20 nm to 200 nm. When the reflective film 31 is thinner than 20 nm, it does not readily radiate heat generated in the L1 recording film 33. On the other hand, when the reflective film 31 is thicker than 200 nm, the productivity of the optical recording medium 10 is lowered since a long time is required for forming the reflective film 31 and there is a risk of cracking the reflective film 31 due to internal stress or the like.

The material for forming the reflective film 31 is not particularly limited. The reflective film 31 may be formed of the same material as that used for forming the reflective film 21 but unlike the case of forming the reflective film 21 included in the L0 layer 20, it is unnecessary to consider the light transmittance of the material when a material is selected for forming the reflective film 31.

The optical recording medium 10 having the above-described configuration can, for example, be fabricated in the following manner.

FIGS. 3 to 6 show the steps of a method for fabricating the optical recording medium 10 according to this embodiment.

Figure 3:
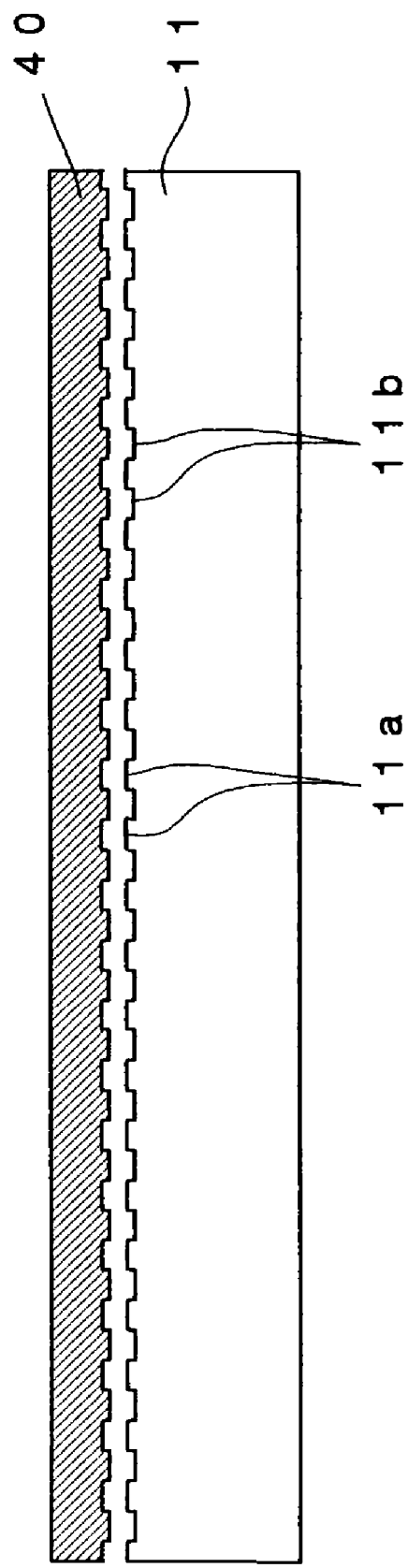
FIG. 3 is a drawing showing a step of a method for fabricating an optical recording medium which is a preferred embodiment of the present invention.

As shown in FIG. 3, the support substrate 11 having grooves 11a and lands 11b on the surface thereof is first fabricated by an injection molding process using a stamper 40.

Figure 4:
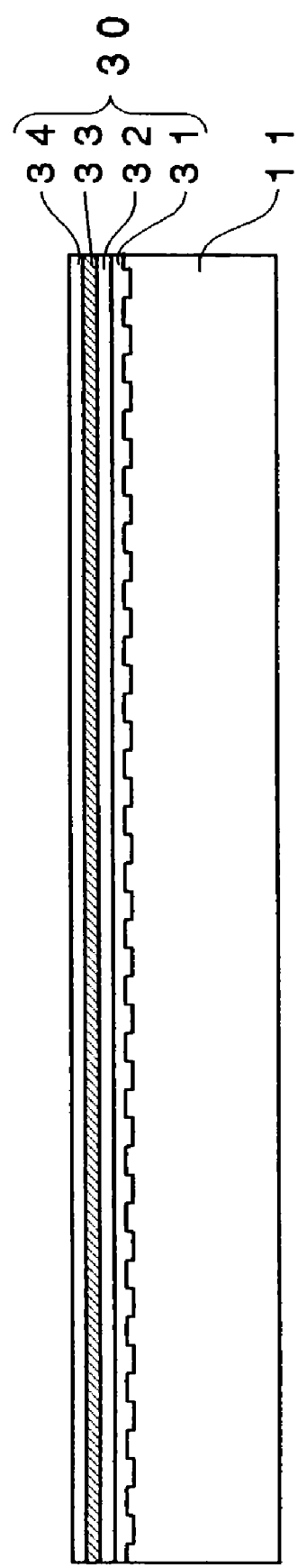
FIG. 4 is a drawing showing a step of a method for fabricating an optical recording medium which is a preferred embodiment of the present invention.

Then, as shown in FIG. 4, the reflective film 31, the fourth dielectric film 32, the L1 recording film 33 and the third dielectric film 34 are sequentially formed on the substantially entire surface of the support substrate 11 on which the grooves 11a and the lands 11b are formed by a gas phase growth process such as a sputtering process, thereby forming the L1 layer 30. The L1 recording film 33 is normally in an amorphous state immediately after formation by a sputtering process or the like.

Figure 5:
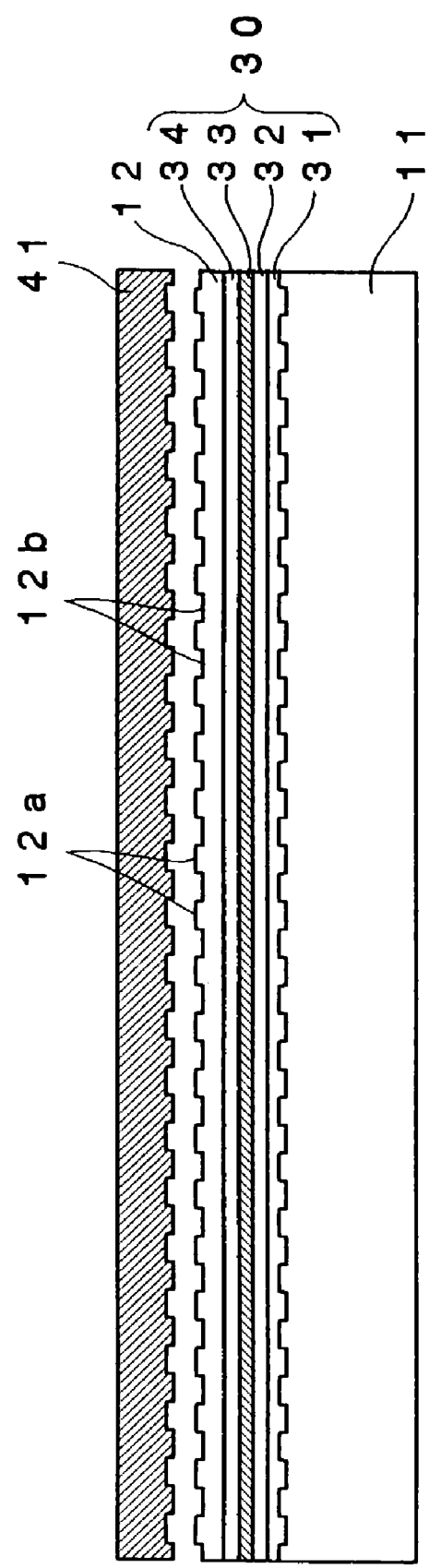
FIG. 5 is a drawing showing a step of a method for fabricating an optical recording medium which is a preferred embodiment of the present invention.

Further, as shown in FIG. 5, an ultraviolet ray curable resin is coated on the L1 layer 30 by a spin coating method to form a coating film and the surface of the coating film is irradiated with an ultraviolet ray via a stamper 41 while it is covered by the stamper 41, thereby forming the transparent intermediate layer 12 formed with grooves 12a and lands 12b on the surface thereof.

Figure 6:
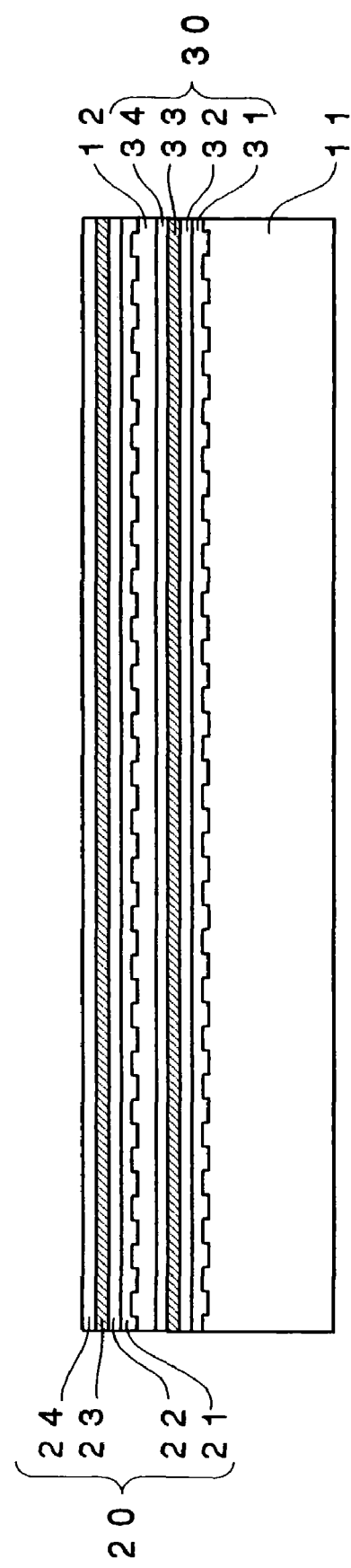
FIG. 6 is a drawing showing a step of a method for fabricating an optical recording medium which is a preferred embodiment of the present invention.

Then, as shown in FIG. 6, the reflective film 21, the second dielectric film 22, the L0 recording film 23 and the first dielectric film 24 are sequentially formed on substantially the entire surface of the transparent intermediate layer 12 on which the grooves 12a and the lands 12b are formed, by a gas phase growth process such as a sputtering process, thereby forming the L0 layer 20. The L0 recording film 23 is normally in an amorphous state immediately after formation by a sputtering process or the like.

An ultraviolet ray curable resin is further coated on the L0 layer 20 by a spin coating method to form a coating film and the surface of the coating film is irradiated with an ultraviolet ray, thereby forming the light transmission layer 13.

This completes the fabrication of the optical recording medium 10.

The optical recording medium 10 is then set on a rotatable table of a laser illumination apparatus (not shown) and while the rotatable table is being rotated, the optical recording medium 10 is continuously irradiated with a laser beam L having such a rectangular beam cross-section whose length is short in the direction along a track (circumferential direction of the optical recording medium 10) and whose length is long in a direction perpendicular to the track (radial direction of the optical recording medium 10) in such a manner that the position irradiated with the laser beam is dislocated in a direction perpendicular to the track every rotation of the optical recording medium 10, thereby irradiating substantially the entire surfaces of the L0 recording film 23 and the L1 recording film 33 with the laser beam L of rectangular cross-section.

As a result, the phase change material contained in the L0 recording film 23 and the L1 recording film 33 is heated to a temperature equal to or higher than the crystallization temperature thereof and then gradually cooled, whereby substantially the entire surfaces of the L0 recording film 23 and the L1 recording film 33 are crystallized. In this specification, this process is referred to as "an initialization process". In this state, no data are recorded in the L0 recording film 23 and the L1 recording film 33 and the L0 recording film 23 and the L1 recording film 33 are in an unrecorded state.

When the initialization process has been completed in this manner, there is obtained an optical recording medium 10 having the L0 recording film 23 and the L1 recording film 33 in which no data are recorded.

When data are to be recorded in the thus constituted optical recording medium 10, the light incident plane 13a of the light transmission layer 13 is irradiated with a laser beam L whose intensity is modulated and the focus of the laser beam L is adjusted onto the L0 recording film 23 or the L1 recording film 33.

When a predetermined region of the L0 recording film 23 or the L1 recording film 33 is heated by the irradiation with the laser beam L to a temperature equal to or higher than the melting point of the phase change material and quickly cooled, the region assumes an amorphous state. On the other hand, when a predetermined region of the L0 recording film 23 or the L1 recording film 33 is heated by the irradiation with the laser beam L to a temperature equal to or higher than the crystallization temperature of the phase change material and gradually cooled, the region assumes a crystallized state. A record mark is formed by the region in the amorphous state of the L0 recording film 23 or the L1 recording film 33. The length of the record mark and the length of the blank region between the record mark and the neighboring record mark in the direction of the track constitute data recorded in the L0 recording film 23 or the L1 recording film 33.

In this embodiment, the reflective film 21 included in the L0 layer 20 contains Ag as a primary component and C as an additive and has a high light transmittance. Therefore, when data are recorded in the L1 recording film 33, the data can be recorded in the L1 recording film 33 in a desired manner. On the other hand, when data are recorded in the L0 recording film 23, since the reflective film 21 included in the L0 layer 20 has a high thermal conductivity, heat generated by the irradiation with the laser beam is not excessively stored in the L0 recording film 23 included in the L0 layer 20 and it is therefore possible to record data in the L0 recording film 23 in a desired manner.

On the other hand, when data recorded in the optical recording medium 10 are to be reproduced, the light incident plane 13a of the light transmission layer 13 is irradiated with a laser beam L whose intensity is modulated and the focus of the laser beam L is adjusted onto the L0 recording film 23 or the L1 recording film 33.

Since the reflection coefficients of the L0 recording film 23 or the L1 recording film 33 are different between a region in an amorphous state and a region in a crystallized state, it is possible to reproduce data recorded in the L0 recording film 23 or the L1 recording film 33 by detecting the amount of light reflected from the L0 recording film 23 or the L1 recording film 33.

In this embodiment, since the reflective film 21 included in the L0 layer 20 contains Ag as a primary component and C as an additive and has a high light transmittance and a high thermal conductivity, it is possible to reproduce data recorded in the L1 recording film 33.

According to this embodiment, since the reflective film 21 included in the L0 layer 20 is formed of a material containing Ag as a primary component and C as an additive, it is possible to improve the light transmittance and the thermal conductivity of the reflective film 21 included in the L0 layer 20 while preventing the reflective film 21 from being corroded and it is therefore possible to improve the recording characteristics and reproducing characteristics of the L0 recording film 23 and the L1 recording film 33 and improve the storage reliability of the optical recording medium 10.

Figure 7:
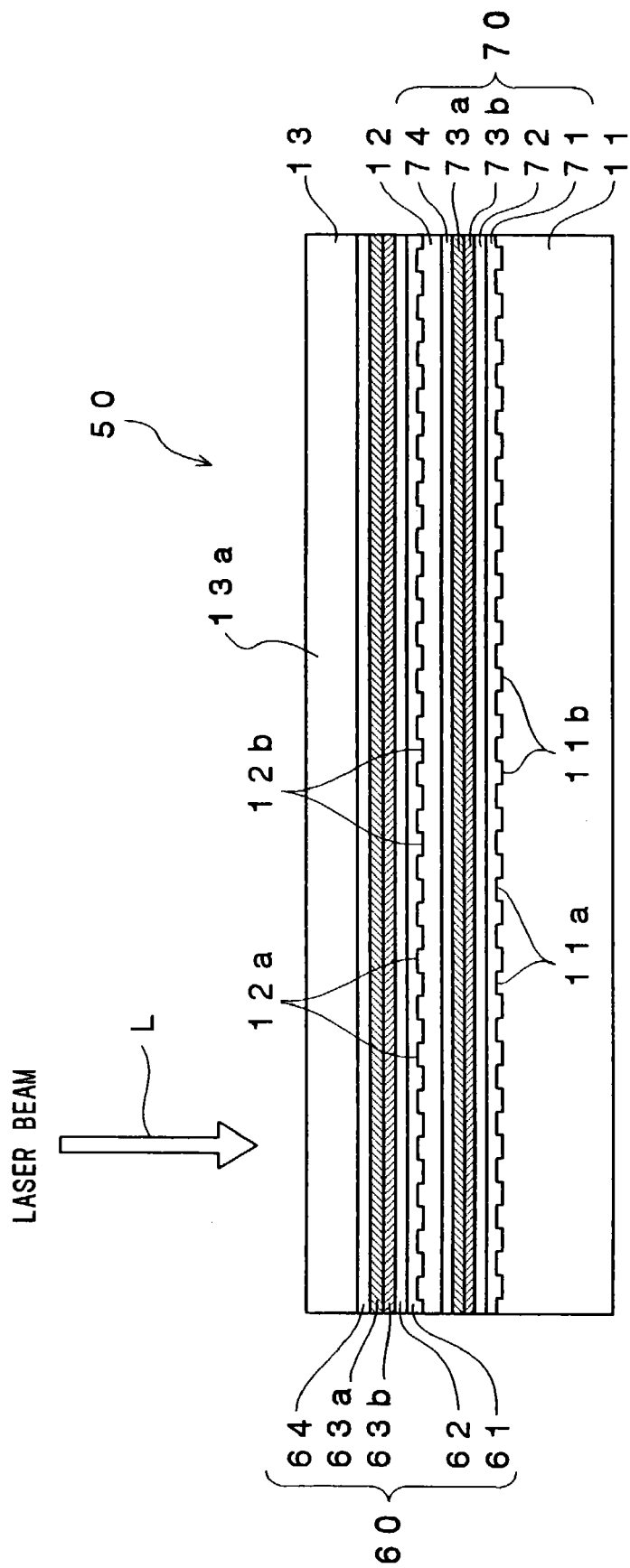
FIG. 7 is a schematic cross-sectional view showing an optical recording medium which is another preferred embodiment of the present invention.

FIG. 7 is a schematic cross-sectional view showing an optical recording medium which is another preferred embodiment of the present invention.

As shown in FIG. 7, an optical recording medium 50 according to this embodiment is constituted as a write-once type optical recording medium and includes a disk-like support substrate 11, a transparent intermediate layer 12, a light transmission layer 13, an L0 layer 60 formed between the transparent layer 12 and the light transmission layer 13, and an L1 layer 70 formed between the support substrate 11 and the transparent intermediate layer 12.

The L0 layer 60 and the L1 layer 70 are recording layers in which data are recorded and the optical recording medium 50 according to this embodiment includes two recording layers.

The L0 layer 60 constitutes a recording layer close to a light incident plane 13a and is constituted by laminating a reflective film 61, a second dielectric film 62, a first L0 recording film 63a, a second L0 recording film 63b and a first dielectric film 64 from the side of the support substrate 11.

On the other hand, the L1 layer 70 constitutes a recording layer far from the light incident plane 13a and is constituted by laminating a reflective film 71, a fourth dielectric film 72, a first L1 recording film 73a, a second L1 recording film 73b and a third dielectric film 74.

In the case where data are to be recorded in the L1 layer 70 and data recorded in the L1 layer 70 are to be reproduced, a laser beam L is projected via the L0 layer 60 located close to the light transmission layer 13.

The optical recording medium 50 according to this embodiment has the same configuration as that of the optical recording medium 10 shown in FIG. 1 except that the L0 layer 60 is provided instead of the L0 layer 20 and the L1 layer 70 is provided instead of the L1 layer 30.

Further, the L0 layer 60 of the optical recording medium 50 according to this embodiment has the same configuration as that of the L0 layer 20 of the optical recording medium 10 shown in FIG. 1 except that the first L0 recording film 63a containing an element selected from the group consisting of Si, Ge, Mg, Al and Sn as a primary component and the second L0 recording film 63b containing Cu as a primary component are provided instead of the L0 recording film 23 containing a phase change material.

Therefore, the reflective film 61 included in the L0 layer 60 contains Ag as a primary component and C as an additive.

Similarly, the L1 layer 70 of the optical recording medium 50 according to this embodiment has the same configuration as that of the L1 layer 30 of the optical recording medium 10 shown in FIG. 1 except that the first L1 recording film 73a containing an element selected from the group consisting of Si, Ge, Mg; Al and Sn as a primary component and the second L1 recording film 73b containing Cu as a primary component are provided instead of the L1 recording film 33 containing a phase change material.

Therefore, the reflective film 71 included in the L1 layer 70 contains Ag as a primary component and C as an additive.

Cu contained in the second L0 recording film 63b or the second L1 recording film 73b as a primary component quickly mixes with the element contained in the first L0 recording film 63a or the first L1 recording film 73a when irradiated with a laser beam L, thereby enabling data to be quickly recorded in the L0 layer 60 or the L1 layer 70.

In order to improve the recording sensitivity of the first L0 recording film 63a or the first L1 recording film 73a, one or more elements selected from a group consisting of Mg, Al, Cu, Ag and Au may be further added to the first L0 recording film 63a or the first L1 recording film 73a.

In order to improve the storage reliability and the recording sensitivity of the second L0 recording film 63b or the second L1 recording film 73b, at least one element selected from the group consisting of Al, Si, Zn, Mg and Au may be further added to the second L0 recording film 63b or the second L1 recording film 73b. The amount of the element (elements) added to the second L0 recording film 63b or the second L1 recording film 73b is preferably equal to or more than 1 atomic % and less than 50 atomic %.

It is preferable to form the first L0 recording film 63a and the second L0 recording film 63b so that the total thickness thereof is 2 nm to 15 nm and it is preferable to form the first L1 recording film 73a and the second L1 recording film 73b so that the total thickness thereof is 2 nm to 40 nm.

When the total thickness of the first L0 recording film 63a and the second L0 recording film 63b or the total thickness of the first L1 recording film 73a and the second L1 recording film 73b is less than 2 nm, the change in reflection coefficient between before and after irradiation with the laser beam L is small so that a reproduced signal having high strength cannot be obtained.

On the other hand, when the total thickness of the first L0 recording film 63a and the second L0 recording film 63b exceeds 15 nm, the light transmittance of the L0 layer 60 is lowered and the recording characteristic and the reproducing characteristic of the L1 layer 70 are degraded.

Further, when the total thickness of the first L1 recording film 73a and the second L1 recording film 73b exceeds 40 nm, the mixing rate of the element contained in the first L1 recording film 73a as a primary component and the element contained in the second L1 recording film 73b is low and it becomes difficult to record data at high speed.

Further, it is preferable to define the ratio of the thickness of the first. L0 recording film 63a to the thickness of the second L0 recording film 63b (thickness of the first L0 recording film 63a/thickness of the second L0 recording film 63b) and the ratio of the thickness of the first L1 recording film 73a to the thickness of the second L1 recording film 73b (thickness of the first L1 recording film 73a/thickness of the second L1 recording film 73b) to be from 0.2 to 5.0.

The optical recording medium 50 having the above-described configuration can, for example, be fabricated in the following manner.

As shown in FIG. 3, the support substrate 11 having grooves 11a and lands 11b on the surface thereof is first fabricated by an injection molding process using a stamper 40.

Then, similarly to what is shown in FIG. 4, the reflective film 71, the fourth dielectric film 72, the second L1 recording film 73b, the first L1 recording film 73a and the third dielectric film 74 are sequentially formed on substantially the entire surface of the support substrate 11 on which the grooves 11a and the lands 11b are formed, by a gas phase growth process such as a sputtering process, thereby forming the L1 layer 70.

Further, similarly to what is shown in FIG. 5, an ultraviolet ray curable resin is coated on the L1 layer 70 by a spin coating method to form a coating film and the surface of the coating film is irradiated with an ultraviolet ray via a stamper 41 while it is covered by the stamper 41, thereby forming the transparent intermediate layer 12 formed with grooves 12a and lands 12b on the surface thereof Then, similarly to what is shown in FIG. 6, the reflective film 61, the second dielectric film 62, the second L0 recording film 63b, the first L0 recording film 63a and the first dielectric film 64 are sequentially formed on substantially the entire surface of the transparent intermediate layer 12 on which the grooves 12a and the lands 12b are formed by a gas phase growth process such as a sputtering process, thereby forming the L0 layer 60.

An ultraviolet ray curable resin is further coated on the L0 layer 60 by a spin coating method to form a coating film and the surface of the coating film is irradiated with an ultraviolet ray, thereby forming the light transmission layer 13.

This completes the fabrication of the optical recording medium 50.

When data are to be recorded in the thus constituted optical recording medium 50, the light incident plane 13a of the light transmission layer 13 is irradiated with a laser beam L whose intensity is modulated and the focus of the laser beam L is adjusted onto the first L0 recording film 63a and the second L0 recording film 63b or onto the first L1 recording film 73a and the second L1 recording film 73b.

Figure 8:
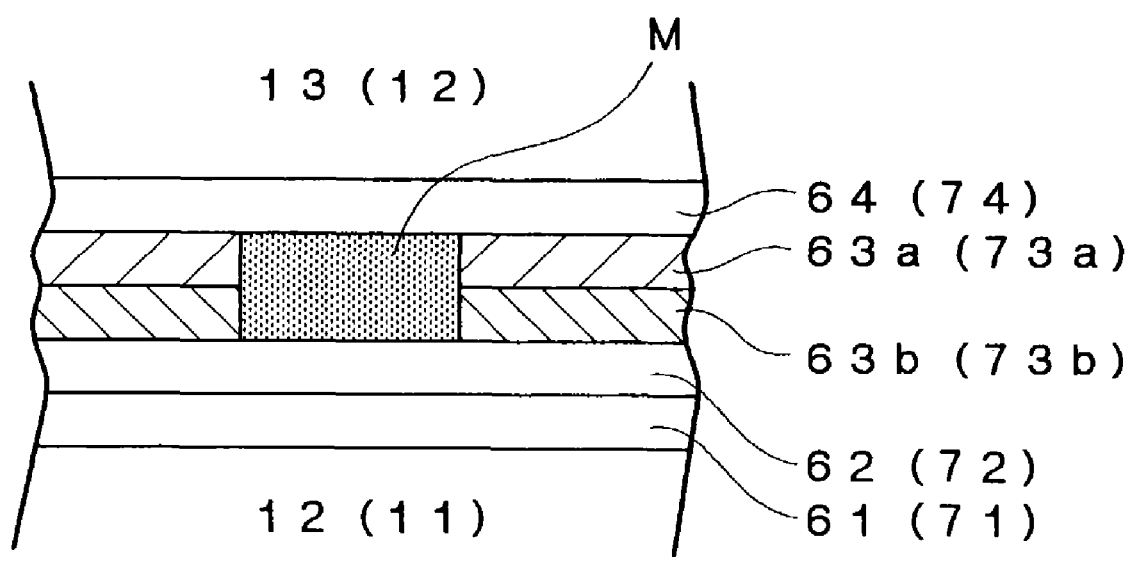
FIG. 8 is a schematic enlarged cross-sectional view of the optical recording medium shown in FIG. 7.

As a result, the element contained in the first L0 recording film 63a as a primary component and Cu contained in the second L0 recording film 63b as a primary component or the element contained in the first L1 recording film 73a as a primary component and Cu contained in the second L1 recording film 73b as a primary component are mixed with each other and as shown in FIG. 8, a record mark M is formed.

In this manner, record marks M are formed in the L0 layer 60 or the L1 layer 70 and data are recorded therein.

In this embodiment, since the reflective film 61 included in the L0 layer 60 contains Ag as a primary component and C as an additive and has a high light transmittance, even when data are recorded in the L1 layer 70, it is possible to record data in the L1 layer 70 in a desired manner. On the other hand, when data are recorded in the L0 layer 60, since the reflective film 61 included in the L0 layer 60 has a high thermal conductivity, heat generated by the irradiation with the laser beam is not excessively stored in the first L0 recording film 63a and the second L0 recording film 63b included in the L0 layer 60 and it is therefore possible to record data in the L0 layer 60 in a desired manner.

On the other hand, when data recorded in the optical recording medium 50 are to be reproduced, the light incident plane 13a of the light transmission layer 13 is irradiated with a laser beam L whose intensity is modulated and the focus of the laser beam L is adjusted onto the L0 layer 60 or the L1 layer 70.

Since the reflection coefficient of the record mark M formed by mixing the element contained in the first L0 recording film 63a as a primary component and Cu contained in the second L0 recording film 63b as a primary component or the element contained in the first L1 recording film 73a as a primary component and Cu contained in the second L1 recording film 73b as a primary component is greatly different from that of the region surrounding the region where the record mark M is formed, it is possible to obtain a high reproduced signal (C/N ratio) by detecting the amount of light reflected from the L0 layer 60 or the L1 layer 70.

According to this embodiment, since the reflective film 61 included in the L0 layer 60 is formed of a material containing Ag as a primary component and C as an additive, it is possible to improve a light transmittance and a thermal conductivity of the reflective film 61 included in the L0 layer 60 while preventing the reflective film 61 from being corroded and it is therefore possible to improve the recording characteristics and reproducing characteristics of the L0 layer 60 and the L1 layer 70 and improve the storage reliability of the optical recording medium 50.

WORKING EXAMPLES

Hereinafter, working examples will be set out in order to further clarify the advantages of the present invention.

Working Example 1

An optical recording medium sample was fabricated in the following manner.

A disk-like polycarbonate substrate having a thickness of 1.1 mm and a diameter of 120 mm was first fabricated by an injection molding process. No grooves or lands were formed on the surface of the polycarbonate substrate.

Then, the polycarbonate substrate was set on a sputtering apparatus and a reflective film containing Ag as a primary component and C as an additive and having a thickness of 8 nm, a second dielectric film containing a mixture of ZnS and $SiO_2$ and having a thickness of 32 nm, a second recording film containing Si as a primary component and having a thickness of 5 nm, a first recording film containing Cu as a primary component and having a thickness of 5 nm and a first dielectric film containing the mixture of. ZnS and $SiO_2$ and having a thickness of 30 nm were sequentially formed on the polycarbonate substrate using the sputtering process.

Further, the first dielectric film was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 100 µm.

The mole ratio of ZnS to $SiO_2$ in the mixture of ZnS and $SiO_2$ contained in the first dielectric layer and the second dielectric layer was 80:20.

In this manner, seven optical recording medium samples were fabricated with varying amounts of C added to the reflective film.

Each of the thus fabricated optical recording medium samples was irradiated with a laser beam having a wavelength of 405 nm via the light transmission layer and the amount of the laser beam coming out from the polycarbonate substrate was detected, thereby measuring the light transmittance of the reflective film of the optical recording medium sample.

Figure 9:
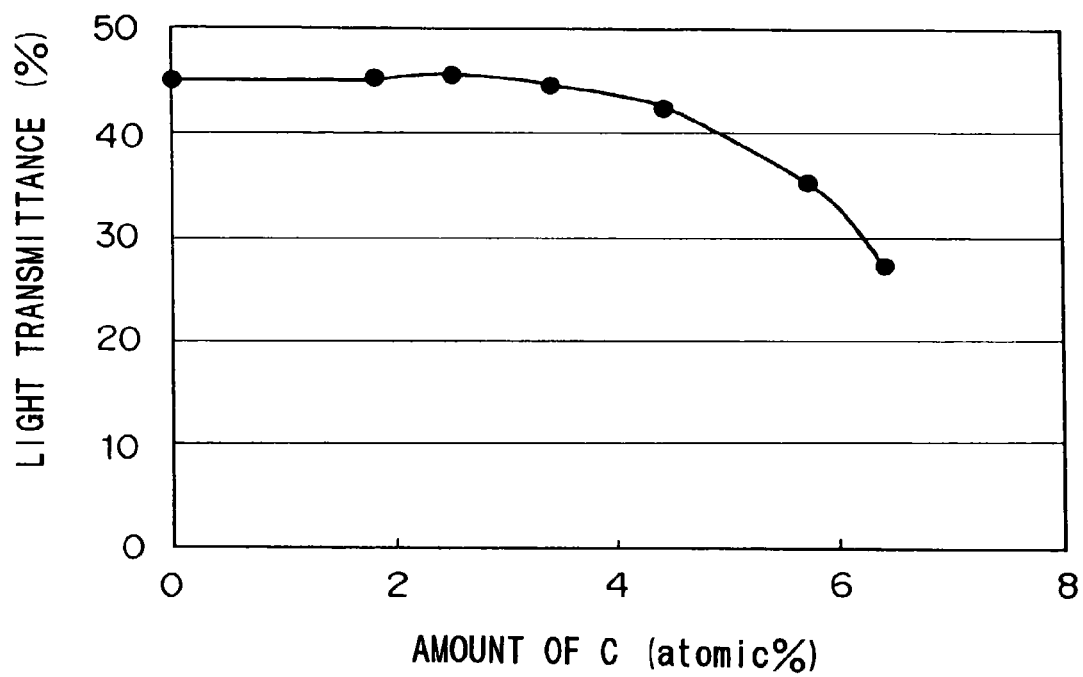
FIG. 9 is a graph showing how light transmittance of a reflective film varies with amount of C added to the reflective film.

The results of the measurements are shown in FIG. 9.

As shown in FIG. 9, it was found that in the case where the amount of C added to the reflective film was equal to or less than about 2.5 atomic %, the light transmittance of the reflective film was substantially the same as that of a reflective film formed of Ag only but that in the case where the amount of C added to the reflective film exceeded about 2.5 atomic %, the light transmittance of the reflective film gradually decreased as the amount of C added to the reflective film increased and that in the case where the amount of C added to the reflective film exceeded about 5.0 atomic %, the light transmittance of the reflective film became lower than 40%.

Working Example 2

Samples were fabricated in the following manner.

A disk-like polycarbonate substrate having a thickness of 1.1 mm and a diameter of 120 mm was first fabricated by an injection molding process. No grooves or lands were formed on the surface of the polycarbonate substrate.

Then, the polycarbonate substrate was set on a sputtering apparatus and a reflective film containing Ag as a primary component and C as an additive and having a thickness of 100 nm was formed on the polycarbonate substrate using the sputtering process.

In this manner, six samples were fabricated with varying amounts of C added to the reflective film.

The reflective film of each of the thus fabricated samples was irradiated with a laser beam having a wavelength of 405 nm and the amount of the laser beam reflected by the reflective film was detected, thereby measuring the reflection coefficient Rco of the reflective film of the sample.

Further, each of the samples was held at a temperature of 80° C. and relative humidity of 85% for 50 hours, thereby conducting a storage test on each of the samples. Following this test, the reflective film of each of the samples was again irradiated with a laser beam having a wavelength of 405 nm and the amount of the laser beam reflected by the reflective film was detected, thereby measuring the reflection coefficient Rc of the reflective film of the sample subjected to the storage test.

Based on the thus measured reflection coefficients of the reflective film of each of the samples, the rate of reflection coefficient reduction was evaluated. The rate of reflection coefficient reduction was defined as $(Rco-Rc) \times 100/Rco$ (%).

Figure 10:
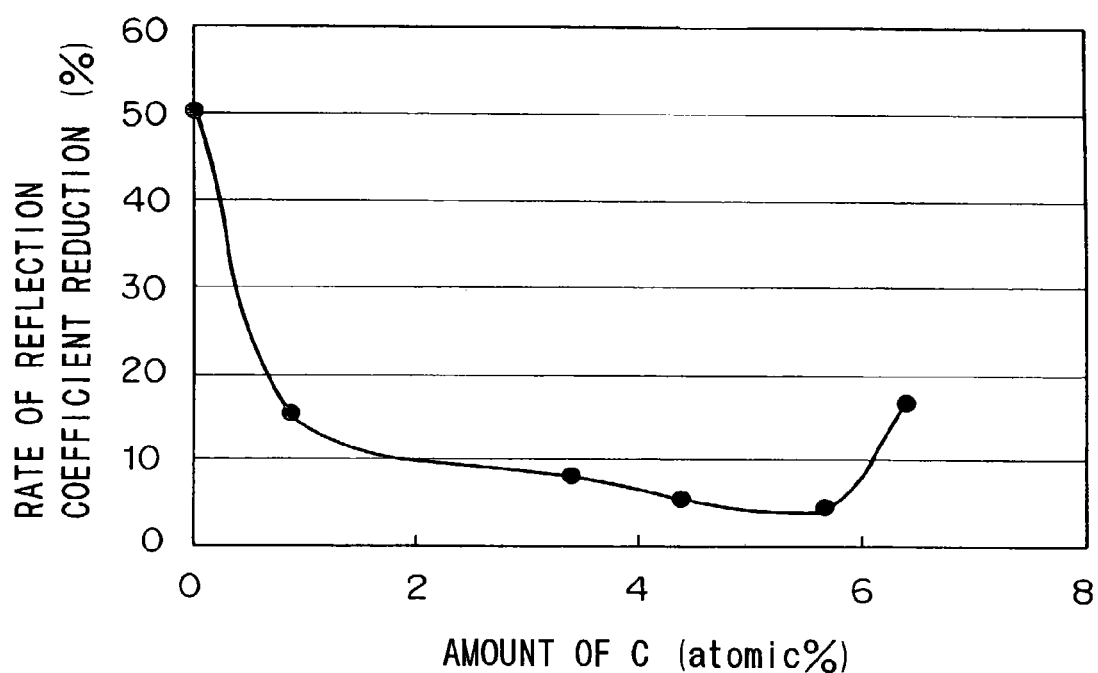
FIG. 10 is a graph showing how rate of reflection coefficient reduction of a reflective film varies with amount of C added to the reflective film.

The results of evaluation are shown in FIG. 10.

As shown in FIG. 10, it was found that the reflection coefficient after the storage test was lower than the reflection coefficient before the storage test in each of the samples. This can be considered to be because Ag contained in the reflective film of each of the samples was corroded by the storage test.

Further, it was found that the rate of reflection coefficient reduction was smaller as the amount of C added to the reflective film increased and that in the case where the amount of C added to the reflective film was less than about 2.0 atomic %, the rate of reflection coefficient reduction markedly decreased with increasing amount of C added to the reflective film.

Working Example 3

Samples were fabricated in the following manner.

A disk-like polycarbonate substrate having a thickness of 1.1 mm and a diameter of 120 mm was first fabricated by an injection molding process. No grooves or lands were formed on the surface of the polycarbonate substrate.

Then, the polycarbonate substrate was set on a sputtering apparatus and a reflective film containing Ag as a primary component and 2.5 atomic % of C as an additive and having a thickness of 100 nm was formed on the polycarbonate substrate using the sputtering process, thereby fabricating a sample #1.

A similarly fabricated polycarbonate substrate was set on a sputtering apparatus and a reflective film containing Ag as a primary component and 5.0 atomic % of C as an additive and having a thickness of 100 nm was formed on the polycarbonate substrate using the sputtering process, thereby fabricating a sample #2.

A similarly fabricated polycarbonate substrate fabricated similarly was set on a sputtering apparatus and a reflective film containing Ag as a primary component and 5.0 atomic % of Sn as an additive and having a thickness of 100 nm was formed on the polycarbonate substrate using the sputtering process, thereby fabricating a comparative sample #1.

A similarly fabricated polycarbonate substrate fabricated similarly was set on a sputtering apparatus and a reflective film containing Ag as a primary component and 10.0 atomic % of W as an additive and having a thickness of 100 nm was formed on the polycarbonate substrate using the sputtering process, thereby fabricating a comparative sample # 2.

The electrical conductivity of the reflective film of each of the samples #1 and #2 and the comparative samples #1 and #2 was measured by a four probe method and the thermal conductivity of the reflective film of each sample was calculated using the Wiedemann-Franz law.

The measurement and calculation results are shown in Table 1.

TABLE 1

|  | Thermal Conductivity (W/mK) |
| --- | --- |
| Sample #1 | 163.0 |
| Sample #2 | 91.1 |
| Comparative Sample #1 | 42.8 |
| Comparative Sample #2 | 12.5 |

As shown in Table 1, it was found that the reflective film containing Ag as a primary component and C as an additive had a much higher thermal conductivity than that of the reflective film containing Ag as a primary component and Sn as an additive and that of the reflective film containing Ag as a primary component and W as an additive.

From the Working Examples 1 to 3, it was found that it was preferable to form a reflective film of a material containing Ag as a primary component and 0.5 atomic % to 5.0 atomic % of C as an additive and is more preferable to form a reflective film of a material containing Ag as a primary component and 1.0 atomic % to 4.0 atomic % of C as an additive in order to form a reflective film having a high light transmittance, a high thermal conductivity and an excellent storage reliability Further, it was found that it was most preferable to form a reflective film of a material containing Ag as a primary component and about 2.5 atomic % of C as an additive in order to form a reflective film having a high light transmittance, a high thermal conductivity and an excellent storage reliability.

The present invention has thus been shown and described with reference to specific embodiments. However, it should be noted that the present invention is in no way limited to the details of the described arrangements but changes and modifications may be made without departing from the scope of the appended claims.

For example, in the embodiment shown in FIGS. 1 and 2, although the optical recording medium 10 includes the L0 recording film 23 and the L1 recording film 33 containing a SbTe system material, it is not absolutely necessary for the optical recording medium 10 to include the L0 recording film 23 and the L1 recording film 33 containing a SbTe system material and the optical recording medium 10 may include an L0 recording film and an L1 recording film containing another phase change material.

Further, in the embodiment shown in FIGS. 7 and 8, although the first L0 recording film 63a and the second L0 recording film 63b of the L0 layer 60 are formed in contact with each other it is not absolutely necessary to form the first L0 recording film 63a and the second L0 recording film 63b of the L0 layer 60 in contact with each other but it is sufficient for the second L0 recording film 63b to be so located in the vicinity of the first L0 recording film 63a as to enable formation of a mixed region including the primary component element of the first L0 recording film 63a and the primary component element of the second L0 recording film 63b when the region is irradiated with a laser beam. Further, one or more other films such as a dielectric film may be interposed between the first L0 recording film 63a and the second L0 recording film 63b.

Furthermore, in the embodiment shown in FIGS. 7 and 8, although the first L1 recording film 73a and the second L1 recording film 73b of the L1 layer 70 are formed in contact with each other it is not absolutely necessary to form the first L1 recording film 73a and the second L1 recording film 73b of the L1 layer 70 in contact with each other but it is sufficient for the second L1 recording film 73b to be so located in the vicinity of the first L1 recording film 73a as to enable formation of a mixed region including the primary component element of the first L1 recording film 73a and the primary component element of the second L1 recording film 73b when the region is irradiated with a laser beam. Further, one or more other films such as a dielectric film may be interposed between the first L1 recording film 73a and the second L1 recording film 73b.

Moreover, in the embodiment shown in FIGS. 7 and 8, although the L0 layer 60 includes the first L0 recording film 63a and the second L0 recording film 63b, the L0 layer 60 may include one or more recording films containing the same element as a primary component as that contained in the first L0 recording film 63a as a primary component or one or more recording films containing the same element as a primary component as that contained in the second L0 recording film 63b as a primary component, in addition to the first L0 recording film 63a and the second L0 recording film 63b.

Further, in the embodiment shown in FIGS. 7 and 8, although the L1 layer 70 includes the first L1 recording film 73a and the second L1 recording film 73b, the L1 layer 70 may include one or more recording films containing the same element as a primary component as that contained in the first L1 recording film 73a as a primary component or one or more recording films containing the same element as a primary component as that contained in the second L1 recording film 73b as a primary component, in addition to the first L1 recording film 73a and the second L1 recording film 73b.

Furthermore, in the embodiment shown in FIGS. 7 and 8, although each of the first L0 recording film 63a and the first L1 recording film 73a contains an element selected from the group consisting of Si, Ge, Mg, Al and Sn as a primary component and each of the second L0 recording film 63b and the second recording film 73b contains Cu as a primary component, it is not absolutely necessary for each of the first L0 recording film 63a and the first L1 recording film 73a to contain an element selected from the group consisting of Si, Ge, Mg, Al and Sn as a primary component and for each of the second L0 recording film 63b and the second recording film 73b to contain Cu as a primary component. Each of the first L0 recording film 63a and the first L1 recording film 73a may contain an element other than Si, Ge, Mg, Al and Sn as a primary component and each of the second L0 recording film 63b and the second recording film 73b may contain an element other than Cu as a primary component.

Moreover, in the embodiment shown in FIGS. 7 and 8, although the first L0 recording film 63a is disposed on the side of the light transmission layer 13 and the second L0 recording film 63b is disposed on the side of the support substrate 11, it is possible to dispose the first L0 recording film 63a on the side of the support substrate 11 and the second L0 recording film 63b on the side of the light transmission layer 13.

Further, in the embodiment shown in FIGS. 7 and 8, although the first L1 recording film 73a is disposed on the side of the light transmission layer 13 and the second L1 recording film 73b is disposed on the side of the support substrate 11, it is possible to dispose the first L1 recording film 73a on the side of the support substrate 11 and the second L1 recording film 73b on the side of the light transmission layer 13.

Furthermore, although the optical recording medium 10 includes the L0 recording film 23 and the L1 recording film 33 in the embodiment shown in FIGS. 1 and 2 and the optical recording medium 50 includes the L0 layer 60 and the L1 layer 70 in the embodiment shown in FIGS. 7 and 8, it is not absolutely necessary for the optical recording medium to include two recording layers but the optical recording medium may include three or more recording layers.

Further, in the above described embodiment, although the reflective film 21 of the L0 layer 20 or the reflective film 61 of the L0 layer 60 is formed on the transparent intermediate layer 12, it is possible to provide a protective layer having a thickness of 2 nm to 150 nm and made of a material for forming the first dielectric film 24, 64 between the transparent intermediate layer 12 and the reflective film 21 or the reflective film 61 and physically space the reflective film 21 or the reflective film 61 and the transparent intermediate layer 12, thereby preventing the transparent intermediate layer 12 from being damaged by heat when data are recorded in the L0 layer 20 or the L0 layer 60.

Furthermore, in the above described embodiment, although the light transmission layer 13 is formed on the surface of the first dielectric film 24 of the L0 layer 20 or the first dielectric film 64 of the L0 layer 60, it is possible to provide a transparent heat radiation film having a thickness of 10 nm t0 200 nm and made of a material having higher thermal conductivity than that of the material forming the first dielectric film 24, 64 between the first dielectric film 24 of the L0 layer 20 or the first dielectric film 64 of the L0 layer 60 and the light transmission layer 13 in order to improve heat radiation characteristics of the L0 layer 20 or the L0 layer 60 and it is further possible to provide a dielectric film having a different refractive index from that of the transparent heat radiation film between the transparent heat radiation film and the light transmission layer 13 in order to increase light interference effect.

Moreover, although the optical recording medium 10 includes the L0 recording film 23 and the L1 recording film 33 each containing a phase change material in the embodiment shown in FIGS. 1 and 2 and the optical recording medium 50 includes the L0 layer 60 including the first L0 recording film 63a and the second L0 recording film 63b each containing an inorganic element as a primary component and the L1 layer 70 including the first L1 recording film 73a and the second L1 recording film 73b each containing an inorganic element as a primary component, the present invention is not limited to optical recording media having such configurations and can be widely applied to an optical recording medium having a plurality of recording layers.

According to the present invention, it is possible to provide an optical recording medium having a plurality of recording layers and in which recording characteristics and reproducing characteristic of the respective recording layers can be improved.

The invention claimed is:

1. An optical recording medium comprising a substrate, a light transmission layer and a plurality of recording layers between the substrate and the light transmission layer and capable of recording data in the plurality of recording layers and reproducing data recorded in the plurality of recording layers by projecting a laser beam via the light transmission layer onto the plurality of recording layers, wherein data are recorded in and reproduced from a farthest recording layer from the light transmission layer by projecting the laser beam thereonto via the light transmission layer and at least one recording layer other than the farthest recording layer and the at least one recording layer other than the farthest recording layer from the light transmission layer includes a reflective film containing Ag as a primary component and C as a secondary component, wherein each of the plurality of recording layers includes a first recording film containing one kind of element selected from a group consisting of Si, Ge, Sn, Mg, C, Al, Zn, In, Cu and Bi as a primary component and a second recording film disposed in the vicinity of the first recording film and containing one kind of element from a group consisting of Cu, Al, Zn, Si and Ag and different from the element contained in the first recording film as a primary component, and the element contained in the first recording film as a primary component and the element contained in the second recording film as a primary component are mixed when the first recording film and the second recording film are irradiated with the laser beam, thereby forming a record mark, wherein by atomic % C is the secondary component of the reflective film included in the at least one recording layer, and wherein the reflective film included in the at least one recording layer consists of Ag and C.

2. An optical recording medium in accordance with claim 1, wherein the reflective film included in the at least one recording layer contains 0.5 atomic % to 5.0 atomic % of C.

3. An optical recording medium in accordance with claim 2, wherein the reflective film included in the at least one recording layer contains 1.0 atomic % to 4.0 atomic % of C.

4. An optical recording medium in accordance with claim 3, wherein the reflective film included in the at least one recording layer contains about 2.5 atomic % of C.

5. An optical recording medium comprising a substrate, a light transmission layer and a plurality of recording layers between the substrate and the light transmission layer and capable of recording data in the plurality of recording layers and reproducing data recorded in the plurality of recording layers by projecting a laser beam via the light transmission layer onto the plurality of recording layers, wherein data are recorded in and reproduced from a farthest recording layer from the light transmission layer by projecting the laser beam thereonto via the light transmission layer and at least one recording layer other than the farthest recording layer and the at least one recording layer other than the farthest recording layer from the light transmission layer includes a reflective film containing Ag as a primary component and C as an additive, wherein each of the plurality of recording layers includes a first recording film containing one kind of element selected from a group consisting of Si, Sn, Mg, C, Al, Zn, In, and Cu as a primary component and a second recording film disposed in the vicinity of the first recording film and containing one kind of element from a group consisting of Cu, Zn, and Si and different from the element contained in the first recording film as a primary component, and the element contained in the first recording film as a primary component and the element contained in the second recording film as a primary component are mixed when the first recording film and the second recording film are irradiated with the laser beam, thereby forming a record mark.

6. An optical recording medium in accordance with claim 5, wherein the reflective film included in the at least one recording layer contains 0.5 atomic % to 5.0 atomic % of C.

7. An optical recording medium in accordance with claim 6, wherein the reflective film included in the at least one recording layer contains 1.0 atomic % to 4.0 atomic % of C.

8. An optical recording medium in accordance with claim 5, wherein the light transmission layer has a thickness of 30 µm to 200 µm.

9. An optical recording medium in accordance with claim 5, wherein the first recording film and the second recording film are formed so that a total thickness thereof is 2 nm to 40 nm.

10. An optical recording medium in accordance with claim 5, wherein the reflective film included in the at least one recording layer consists of Ag and C.

* * * * *